(12) United States Patent
Choi et al.

(10) Patent No.: US 10,131,582 B2
(45) Date of Patent: Nov. 20, 2018

(54) POLYCRYSTALLINE DIAMOND COMPACT PROVIDED WITH MULTIPLE POLYCRYSTALLINE DIAMOND SINTERED BODIES AND METHOD FOR PRODUCING POLYCRYSTALLINE DIAMOND COMPACT

(71) Applicant: ILJIN DIAMOND CO.,LTD., Eumseong (KR)

(72) Inventors: Dong Ik Choi, Jincheon (KR); Hee Sub Park, Suwon (KR)

(73) Assignee: ILJIN DIAMOND CO.,LTD., Eumseong (KR)

( * ) Notice: Subject to any disclaimer, the term of this patent is extended or adjusted under 35 U.S.C. 154(b) by 103 days.

(21) Appl. No.: 15/113,827

(22) PCT Filed: Feb. 3, 2015

(86) PCT No.: PCT/KR2015/001079
§ 371 (c)(1),
(2) Date: Jul. 23, 2016

(87) PCT Pub. No.: WO2015/119408
PCT Pub. Date: Aug. 13, 2015

(65) Prior Publication Data
US 2016/0347673 A1    Dec. 1, 2016

(30) Foreign Application Priority Data

Feb. 4, 2014  (KR) .................. 10-2014-0012726

(51) Int. Cl.
*C04B 35/645* (2006.01)
*C04B 35/528* (2006.01)
(Continued)

(52) U.S. Cl.
CPC ............ *C04B 35/645* (2013.01); *B32B 18/00* (2013.01); *C04B 35/528* (2013.01);
(Continued)

(58) Field of Classification Search
CPC . C04B 35/645; C04B 35/528; C04B 2235/95; C04B 2235/661;
(Continued)

(56) References Cited

U.S. PATENT DOCUMENTS 6,248,447 B1   6/2001  Griffin et al.
6,601,662 B2 *  8/2003  Matthias ................... B22F 7/06
                                                                    175/374

(Continued)

FOREIGN PATENT DOCUMENTS

KR   10-2009-0048127 A   3/2009
KR   10-2011-0099684 A   9/2011
KR   10-2012-0114240 A   10/2012

*Primary Examiner* — Nahida Sultana
(74) *Attorney, Agent, or Firm* — Patent Office of Dr. Chung Park (57) ABSTRACT

The present invention relates to a polycrystalline diamond compact having multiple polycrystalline diamond sintered bodies and a method for producing the polycrystalline diamond compact. The method for producing the polycrystalline diamond includes: preparing first diamond powder; producing a first polycrystalline diamond sintered body having a diameter smaller than the diameter of a cemented substrate by sintering the first diamond powder under 5 to 6 GPa pressure and 1300 to 1500° C. temperature; positioning the first polycrystalline diamond sintered body in the center of the cemented substrate, and granulating second diamond powder around the first polycrystalline diamond sintered body; and sintering the second diamond powder under 5 to 6 GPa pressure and 1300 to 1500° C. temperature to form a second polycrystalline diamond sintered body. The polycrystalline diamond sintered body has uniform sintered characteristics at the center and outer edges thereof.

8 Claims, 8 Drawing Sheets

(51) Int. Cl.
  *B32B 18/00*     (2006.01)
  *E21B 10/567*    (2006.01)
  *E21B 10/55*     (2006.01)

(52) U.S. Cl.
  CPC ...... *E21B 10/567* (2013.01); *C04B 2235/427* (2013.01); *C04B 2235/661* (2013.01); *C04B 2235/95* (2013.01); *C04B 2237/363* (2013.01); *C04B 2237/588* (2013.01); *C04B 2237/84* (2013.01); *E21B 10/55* (2013.01)

(58) Field of Classification Search
  CPC ........ C04B 2237/588; C04B 2235/427; C04B 2237/363; C04B 2237/84; E21B 10/567; E21B 10/55; B32B 18/00
  See application file for complete search history.

(56) References Cited

U.S. PATENT DOCUMENTS

| | | | | |
|---|---|---|---|---|
| 8,316,969 B1* | 11/2012 | Bertagnolli | ............... | B01J 3/062 175/420.2 |
| 2010/0196717 A1* | 8/2010 | Liversage | ................ | B01J 3/065 428/408 |
| 2011/0031033 A1* | 2/2011 | Mourik | ................... | C22C 26/00 175/428 |
| 2011/0036643 A1* | 2/2011 | Belnap | .................... | C22C 26/00 175/434 |
| 2012/0055717 A1* | 3/2012 | Liversage | ............... | E21B 10/56 175/428 |
| 2012/0097457 A1* | 4/2012 | Setlur | ....................... | B22F 3/16 175/428 |
| 2013/0068525 A1* | 3/2013 | DiGiovanni | ............ | E21B 47/01 175/40 |
| 2013/0292188 A1* | 11/2013 | Bilen | .................. | E21B 10/5676 175/428 |
| 2013/0330139 A1* | 12/2013 | De Reynal | ......... | B24D 18/0009 408/22 |
| 2014/0265530 A1* | 9/2014 | Fries | ........................ | C22C 1/00 299/106 |
| 2015/0261197 A1* | 9/2015 | Wilkinson | ............... | A01G 9/24 700/276 |
| 2016/0312542 A1* | 10/2016 | Nilen | ....................... | C04B 37/00 |
| 2017/0067293 A1* | 3/2017 | Webb | ...................... | E21B 10/56 |
| 2017/0081247 A1* | 3/2017 | Can | .......................... | B01J 3/062 |
| 2017/0144272 A1* | 5/2017 | Eyre | ................. | B24D 18/0009 |
| 2018/0023348 A1* | 1/2018 | Can | ...................... | E21B 10/5735 |
| 2018/0029130 A1* | 2/2018 | Can | ......................... | C22C 26/00 |
| 2018/0051520 A1* | 2/2018 | Beauchamp | .......... | E21B 10/602 |
| 2018/0080285 A1* | 3/2018 | Akhmadi Eko | .... | E21B 10/5673 |
| 2018/0087324 A1* | 3/2018 | Jiang | ..................... | C23C 30/005 |
| 2018/0100234 A1* | 4/2018 | Zhan | .................. | C23C 16/4417 |
| 2018/0258708 A1* | 9/2018 | Burhan | ................... | E21B 10/42 |

* cited by examiner

POLYCRYSTALLINE DIAMOND COMPACT PROVIDED WITH MULTIPLE POLYCRYSTALLINE DIAMOND SINTERED BODIES AND METHOD FOR PRODUCING POLYCRYSTALLINE DIAMOND COMPACT

CROSS-REFERENCE TO PRIOR APPLICATIONS

This application is a national Stage Patent Application of PCT International Patent Application No. PCT/KR2015/001079, filed on Feb. 3, 2015 under 35 U.S.C. § 371, which claims priority of Korean Patent Application No. 10-2014-0012726, filed on Feb. 4, 2014, which are all hereby incorporated by reference in their entirety.

TECHNICAL FIELD

The present invention relates to a polycrystalline diamond compact provided with the multiple polycrystalline diamond sintered bodies and a method for producing the polycrystalline diamond compact, and more particularly, to a polycrystalline diamond compact provided with the multiple polycrystalline diamond sintered bodies and a method for producing the polycrystalline diamond compact capable of minimizing a difference of internal and external properties of the polycrystalline diamond sintered bodies.

BACKGROUND ART

Various cutting tools are used in metal/wood cutting and the like. Particularly, in petroleum and gas drilling fields, the ground needs to be cut and excavated, and thus digging and excavating equipment in which abrasion resistance can be ensured as much as possible is used.

Figure 1:
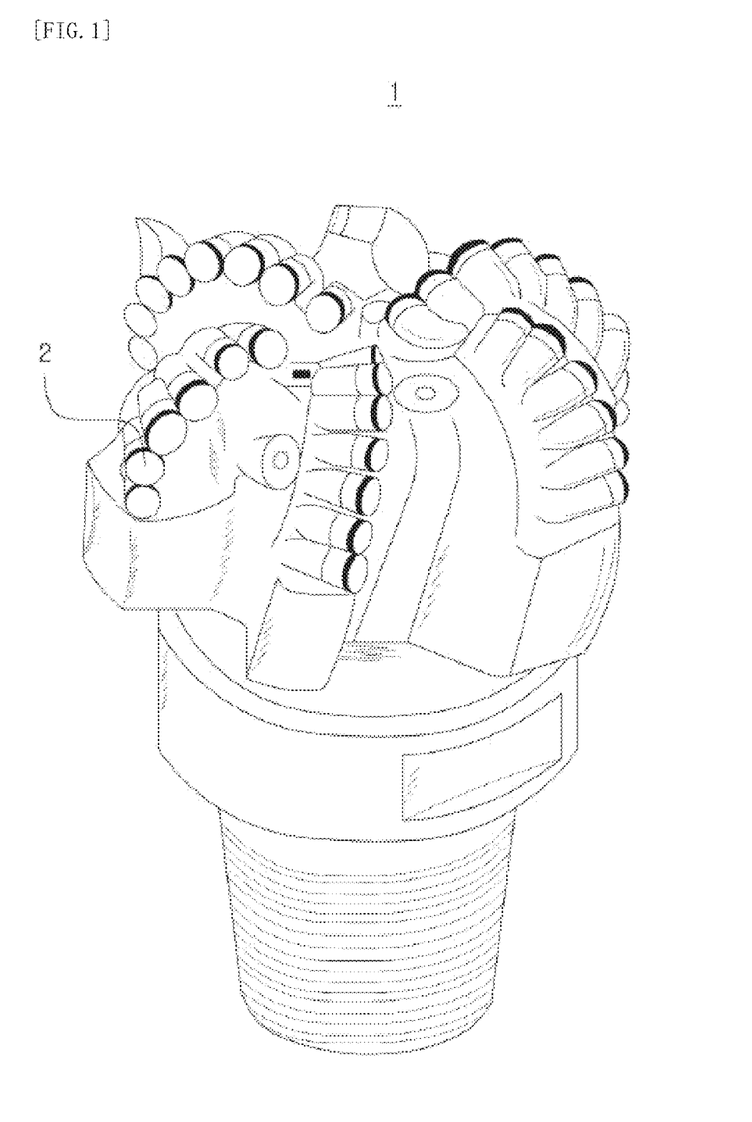
FIG. 1 is a schematic view illustrating an appearance a cutting tool using a polycrystalline diamond compact.

A cutting tool 1 is provided at an end of the equipment as illustrated in FIG. 1. In general, the abrasion resistance may be sufficiently ensured at the end of the cutting tool 1 by using a diamond compact 2 in spite of friction with the ground.

Figure 2:
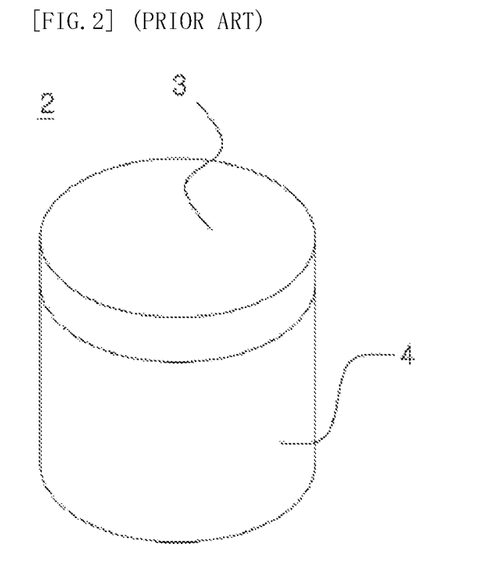
FIG. 2 is a perspective view illustrating an appearance of a polycrystalline diamond compact in the related art.

In FIG. 2, an appearance of a general diamond compact 2 is illustrated. As illustrated in FIG. 2, a polycrystalline diamond compact includes a cemented substrate 4 and a polycrystalline diamond sintered body 3 which is sintered by using diamond powder on the cemented substrate 4. The cemented substrate 4 serves to support the polycrystalline diamond compact 2 to be attached to various tools and the like while the polycrystalline diamond sintered body 3 is attached.

Meanwhile, outer edges of the polycrystalline diamond compact are first heated due to a characteristic of a sintering process under high temperature and high pressure. For this reason, a difference in temperature between a center and the outer edges of the polycrystalline diamond compact is generated during sintering to have a difference in sinterability.

During sintering, according to a characteristic of the final desired polycrystalline diamond compact, an optimal sintering temperature is set. In this case, when the sintering temperature is too low or too high, properties of the polycrystalline diamond compact such as impact resistance or abrasion resistance deviates from a range of the desired properties and thus defects of the product are generated.

SUMMARY OF INVENTION

The present invention is directed to provide a method for producing a polycrystalline diamond compact and a polycrystalline diamond compact according to the same, which can be produced with uniform sintered characteristics at the center and outer edges thereof.

The present invention is also directed to provide a method for producing a polycrystalline diamond compact and a polycrystalline diamond compact according to the same, which can maximally and uniformly form characteristics such as impact resistance and abrasion resistance by minimizing a difference between internal and external degrees of sintering of the polycrystalline diamond compact.

Technical Solution

An aspect of the present invention provides a method for producing a polycrystalline diamond compact provided with multiple polycrystalline diamond sintered bodies in a method for producing a polycrystalline diamond compact in which a diamond sintered body is formed on a cemented substrate, the method comprising: a first step for preparing first diamond powder; a second step for producing a first polycrystalline diamond sintered body having a diameter smaller than the diameter of a cemented substrate by sintering the first diamond powder; a third step for positioning the first polycrystalline diamond sintered body in the center of the cemented substrate, and forming second diamond powder into a ring and disposing the ring on an outer circumferential surface of the first polycrystalline diamond sintered body; and a fourth step for sintering the second diamond powder to form a second polycrystalline diamond sintered body.

The second step may include a 2-1 step for producing an intermediate polycrystalline diamond sintered body having a diameter larger than the diameter of the cemented substrate by sintering the first diamond powder; and a 2-2 step for producing the polycrystalline diamond sintered body by processing the intermediate polycrystalline diamond sintered body.

The first polycrystalline diamond sintered body may be at least two processed from a single intermediate polycrystalline diamond sintered body.

The intermediate polycrystalline diamond sintered body may have a diameter of 60 to 75 mm, the first polycrystalline diamond sintered body may have a diameter of 3 to 15 mm, the second polycrystalline diamond sintered body may have a diameter of 13 to 20 mm, and the diameter of the first polycrystalline diamond sintered body may be formed within 70% of the diameter of the second polycrystalline diamond sintered body.

In the first step and the third step, metal binders may be further included in the first diamond powder and the second diamond powder, respectively.

The metal binder may be cobalt (Co).

The first step may further include mixing metal binder powder with the first diamond powder.

In third step, the metal binder may not be mixed with the second diamond powder, and in the fourth step, the second diamond powder may be sintered by using a metal binder component released from the cemented substrate.

Advantageous Effects

According to the present invention, by sintering the interior and exterior of the polycrystalline diamond sintered body separately, the polycrystalline diamond sintered body can be produced with uniform sintered characteristics at the center and outer edges thereof.

Further, according to the present invention, by minimizing a difference between internal and external degrees of sintering of the polycrystalline diamond compact, characteristics such as impact resistance and abrasion resistance can be maximally and uniformly formed.

BEST MODE OF INVENTION

In a method for producing a polycrystalline diamond compact in which a diamond sintered body is formed on a cemented substrate, the method for producing a polycrystalline diamond compact provided with multiple polycrystalline diamond sintered bodies according to the present invention, comprises: a first step for preparing first diamond powder; a second step for producing a first polycrystalline diamond sintered body having a diameter smaller than the diameter of a cemented substrate by sintering the first diamond powder; a third step for positioning the first polycrystalline diamond sintered body in the center of the cemented substrate, and forming second diamond powder into a ring and disposing the ring on an outer circumferential surface of the first polycrystalline diamond sintered body; and a fourth step for sintering the second diamond powder to form a second polycrystalline diamond sintered body.

DESCRIPTION OF EMBODIMENT(S)

Hereinafter, exemplary embodiments of the present invention will be described in detail with reference to the accompanying drawings. If not particularly defined or mentioned, a term indicating a direction used in the present description is based on a state illustrated in the drawings. Further, through each exemplary embodiment, like reference numerals denote like elements. Meanwhile, the thickness or size of each component illustrated in the drawings may be exaggerated for easy description and does not mean that the thickness or size should be configured by a ratio between the corresponding size or component.

Figure 3:
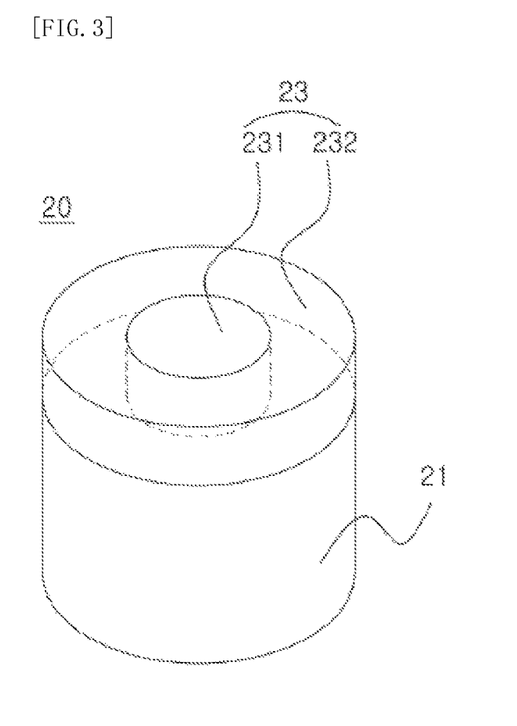
FIG. 3 is a perspective view illustrating an appearance of a polycrystalline diamond compact according to an exemplary embodiment.

A polycrystalline diamond compact according to an exemplary embodiment will be described with reference to FIG. 3. FIG. 3 is a perspective view illustrating an appearance of a polycrystalline diamond compact according to an exemplary embodiment.

A polycrystalline diamond compact 20 according to the exemplary embodiment includes a cemented substrate 21 and a polycrystalline diamond sintered layer 23.

The cemented substrate 21 is a substrate made of cemented carbide and serves to support the polycrystalline diamond compact 20 to be attached to various tools and the like while the polycrystalline diamond sintered layer 23 is attached. The cemented carbide is an alloy having too high hardness made by firing metal carbide powder, as a super hard alloy used in tools and the like. The cemented substrate 21 is compressed at high pressure and heated at a high temperature at which the metal is not dissolved to be sintered and formed by using compound powder such as tungsten carbide and titanium carbide and metal powder such as cobalt as a coupling agent. In addition, WC—TiC—Co, WC—TiC—Ta(NbC)—Co, WC—TaC(NbC)—Co, and the like may be used.

The polycrystalline diamond sintered layer 23 includes a first polycrystalline diamond sintered body 231 and a second polycrystalline diamond sintered body 232.

The first polycrystalline diamond sintered body 231 and the second polycrystalline diamond sintered body 232 are formed by sintering the polycrystalline diamond powder, respectively. The first polycrystalline diamond sintered body 231 is formed to have a diameter smaller than the diameter of the cemented substrate 21 and positioned at the upper center of the cemented substrate 21. The second polycrystalline diamond sintered body 232 is formed on the upper surface of the cemented substrate 21 and around the first polycrystalline diamond sintered body 231.

Further, in order to improve sinterability of the polycrystalline diamond sintered layer 23, a metal binder is used. As the metal binder, for example, cobalt (Co) and the like may be used. In this case, the cobalt (Co) may be sintered by mixing the polycrystalline diamond powder together and sintering may be performed by using a cobalt component released from the cemented substrate 21 during sintering. However, according to whether a subsequent process such as cutting after producing the polycrystalline diamond sintered bodies is required, the metal binder may be pre-mixed with the polycrystalline diamond powder before sintering. For example, when the polycrystalline diamond sintered bodies are produced and then need to be processed with a predetermined size or shape, it is preferred that the sintering is performed by mixing the metal binder powder with the polycrystalline diamond powder.

Figure 4:
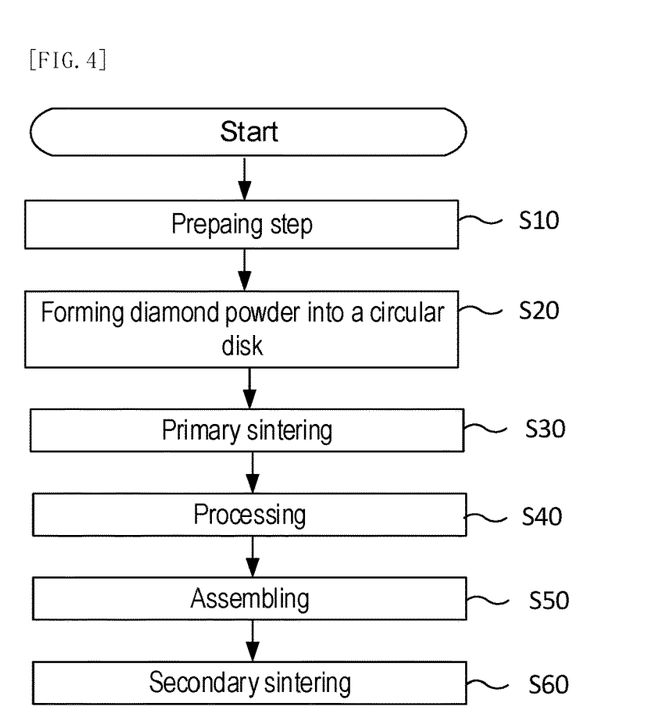
FIG. 4 is a flowchart illustrating a method for producing a polycrystalline diamond compact according to another exemplary embodiment.

A method for producing a polycrystalline diamond sintered body according to another exemplary embodiment will be described with reference to FIGS. 4 to 11. FIG. 4 is a flowchart illustrating a method for producing a polycrystalline diamond compact according to another exemplary embodiment.

First, in a preparing step, materials required for producing a polycrystalline diamond compact according to the exemplary embodiment are prepared (S10). In this case, a cemented substrate, first diamond powder, second diamond powder, and a metal binder if necessary may be prepared.

In this case, metal binder powder, for example, cobalt powder may be mixed with the first diamond powder. In the case of mixing the metal binder with the first diamond powder, a process such as cutting after sintering is easy. In the case where there is no need of cutting, mixing of the metal binder powder will be omitted.

Hereinafter, for convenience for description of the exemplary embodiment, as a metal binder (catalyst) used for sintering the diamond powder, cobalt (Co) will be described as an example. In addition to cobalt, a component such as nickel (Ni) or silicon (Si) may be used as the binder.

The cemented substrate is a substrate made of cemented carbide as described above and is compressed at high pressure and heated at a high temperature at which the metal is not dissolved to be sintered and formed by using compound powder such as tungsten carbide and titanium carbide and metal powder such as cobalt as a coupling agent. In addition, WC—TiC—Co, WC—TiC—Ta(NbC)—Co, WC—TaC(NbC)—Co, and the like may be used.

The composition of the second diamond powder is basically the same as the composition of the first diamond powder, but there is no need of processing after sintering. Accordingly, it is not required to mix a separate metal binder with the second diamond powder.

However, the second polycrystalline diamond sintered body generated by sintering the second diamond powder serves as a cutting edge portion which directly contacts an operated object during operation, and thus the composition may be changed in order to improve heat resistance, abrasion resistance, and the like.

Next, the first polycrystalline diamond sintered body is produced by using the first polycrystalline diamond powder (S20 to S40). Steps of producing the first polycrystalline diamond sintered body includes the step of forming diamond powder into a circular disk (S20), a primary sintering step (S30), and a processing step (S40).

In step (S20), the first polycrystalline diamond powder is formed into a shape of an intermediate polycrystalline diamond sintered body to be produced, and in the primary sintering step (S30), the first polycrystalline diamond powder is sintered under the pressure of 5 to 6 GPa and temperature of 1300 to 1500° C. to form the intermediate polycrystalline diamond sintered body. In the processing step (S40), the intermediate polycrystalline diamond sintered body is cut to form the first polycrystalline diamond sintered body.

Thereafter, an assembly step (S50) and a secondary sintering step (S60) are further performed.

In the assembly step (S50), after the formed first polycrystalline diamond sintered body is positioned on the cemented substrate, the second polycrystalline diamond powder is formed into a ring, where the ring is disposed on an outer circumferential surface of the first polycrystalline diamond sintered body. In the secondary sintering step (S60), the cemented substrate that was generated by sintering the first diamond powder, the first polycrystalline diamond sintered body, and the second polycrystalline diamond powder are sintered under the pressure of 5 to 6 GPa and temperature of 1300 to 1500° C. to form the final polycrystalline diamond compact.

Hereinafter, respective steps will be described in detail.

Figure 5:
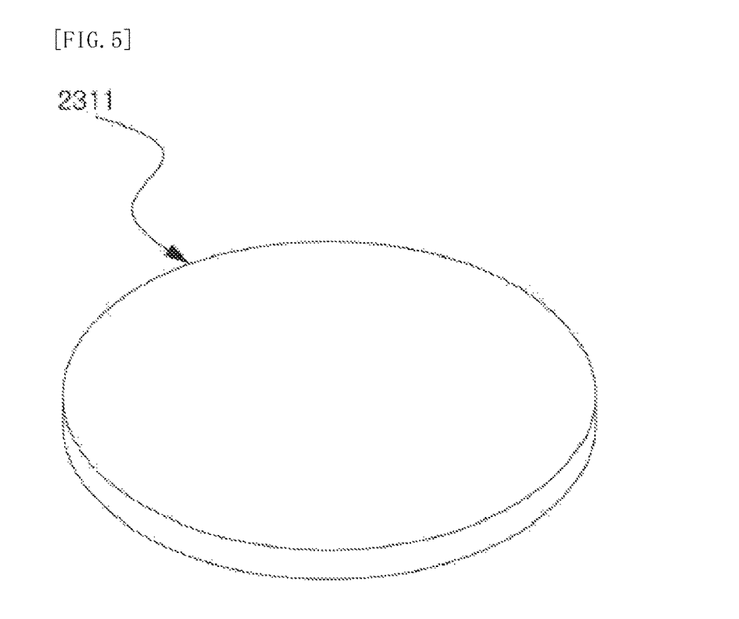
FIG. 5 is a perspective view illustrating an appearance of an intermediate polycrystalline diamond sintered body.
Figure 6:
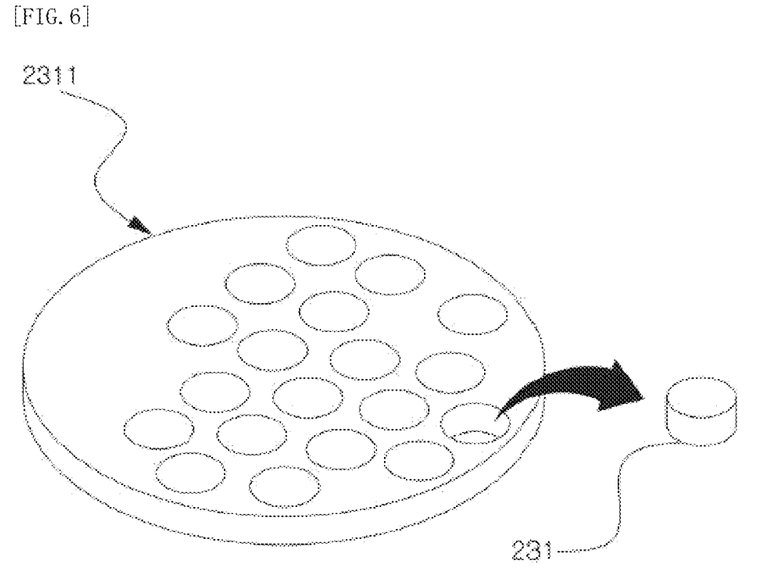
FIG. 6 is a perspective view schematically illustrating an appearance of processing a first polycrystalline diamond sintered body from the intermediate polycrystalline diamond sintered body.

A process for producing the first polycrystalline diamond sintered body from the intermediate polycrystalline diamond sintered body will be described with reference to FIGS. 5 and 6. FIG. 5 is a perspective view illustrating an appearance of an intermediate polycrystalline diamond sintered body and FIG. 6 is a perspective view schematically illustrating an appearance of processing a first polycrystalline diamond sintered body from the intermediate polycrystalline diamond sintered body.

An intermediate polycrystalline diamond sintered body 2311 is formed by sintering the first polycrystalline diamond powder in the primary sintering step (S30) as described above.

The intermediate polycrystalline diamond sintered body 2311 in the exemplary embodiment has a diameter of 60 to 75 mm and is processed to at least two first polycrystalline diamond sintered bodies 231. The first polycrystalline diamond sintered body 231 may have a diameter of 3 to 15 mm. In this case, the diameter of the first polycrystalline diamond sintered body 231 is smaller than the diameter of the cemented substrate described above. When the diameter of the first polycrystalline diamond sintered body 231 is larger or smaller than need be, it is difficult to obtain an effect to be obtained by producing the first polycrystalline diamond sintered body 231. That is, when the size of the first polycrystalline diamond sintered body 231 is too large, a part having low density is generated around a center of the first polycrystalline diamond sintered body 231, whereas when the size of the first polycrystalline diamond sintered body 231 is too small, a part having low density is generated at the inside of the second polycrystalline diamond sintered body 232 or an outer part of the first polycrystalline diamond sintered body 231 is over-sintered and thus a particle growth may be generated.

Meanwhile, unlike the exemplary embodiment, the first polycrystalline diamond sintered body 231 may be formed with the corresponding size through direct sintering without separate processing, but due to inconvenience of production and easiness of processing using existing equipment, and the like, it is preferred that after the intermediate polycrystalline diamond sintered body 2311 having a large size is produced and then the first polycrystalline diamond sintered body 231 is produced through processing.

A process for producing the polycrystalline diamond compact by using the produced first polycrystalline diamond sintered body 231 will be described with reference to FIGS. 7 to 10. FIGS. 7 to 10 are perspective views sequentially illustrating a method for producing a polycrystalline diamond compact according to an exemplary embodiment by using a first polycrystalline diamond sintered body.

Figure 7:
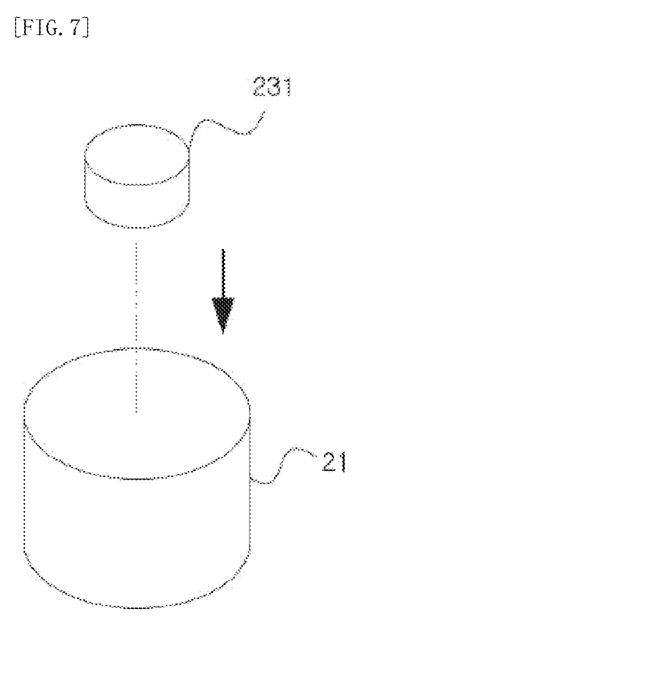
FIGS. 7 to 10 are perspective views sequentially illustrating a method for producing a polycrystalline diamond compact according to an exemplary embodiment by using a first polycrystalline diamond sintered body.
Figure 8:
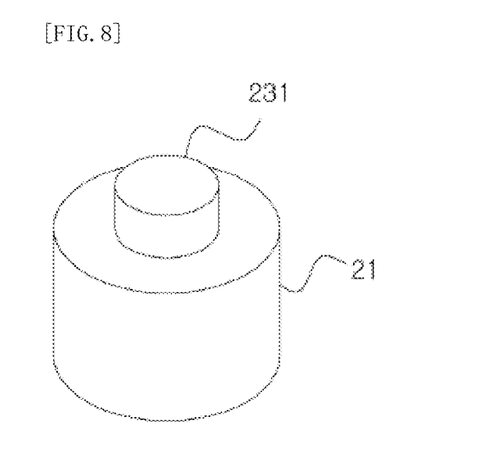

In the assembly step (S50), first, as illustrated in FIGS. 7 and 8, the produced first polycrystalline diamond sintered body 231 is positioned on the cemented substrate 21. The first polycrystalline diamond sintered body 231 is positioned at the upper center of the cemented substrate 21.

Figure 9:
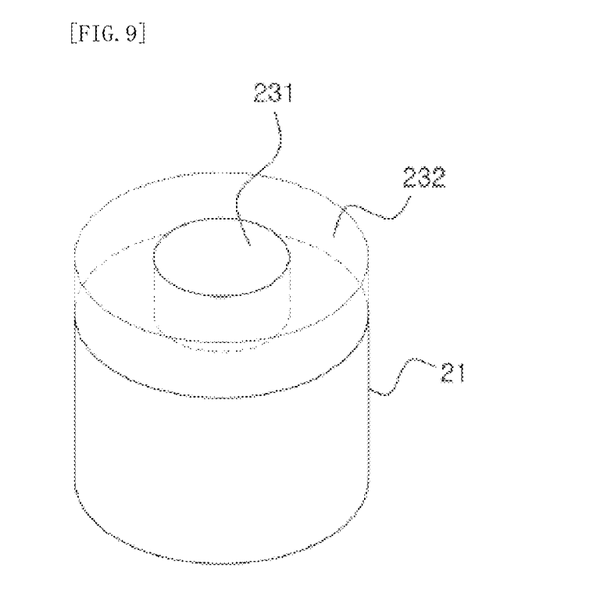

Next, as illustrated in FIG. 9, the second polycrystalline diamond powder 232 is positioned around the first polycrystalline diamond sintered body 231.

Meanwhile, the second polycrystalline diamond sintered body formed by sintering the second polycrystalline diamond powder 232 may have a diameter of 13 to 20 mm. The diameter of the second polycrystalline diamond sintered body is the same as the diameter of the cemented substrate 21 and determined according to a diameter of the diamond compact to be produced. The second polycrystalline diamond sintered body 232 is determined according to a diameter of the final polycrystalline diamond compact to be produced. As described above, the first polycrystalline diamond sintered body 231 may have a size of 3 mm to 15 mm. In this case, the first polycrystalline diamond sintered body 231 may have a diameter of approximately 70% of the diameter of the second polycrystalline diamond sintered body 232 in order to obtain the effect according to the present invention, that is, the effect for minimizing the part having the low density.

Figure 10:
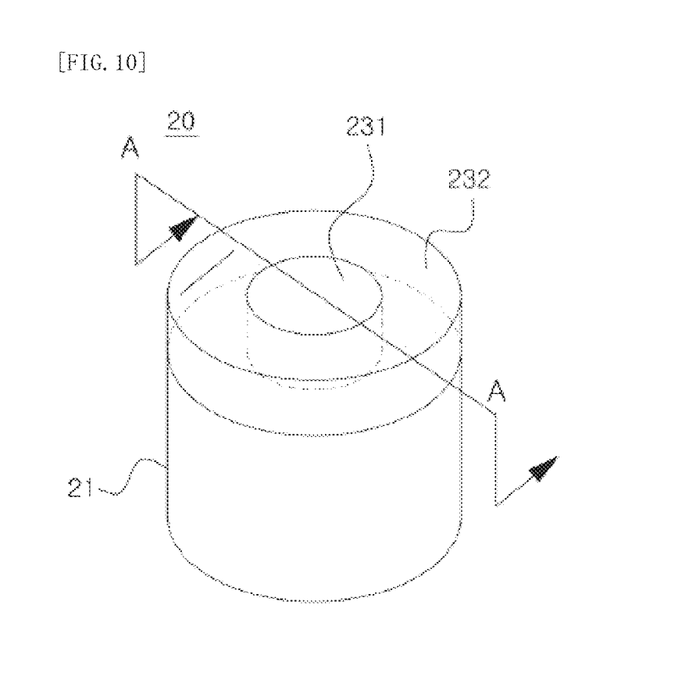

Next, the polycrystalline diamond compact illustrated in FIG. 10 is formed by performing the second sintering step (S60).

The polycrystalline diamond compact which is finally produced will be described with reference to FIGS. 10 and 11. FIG. 10 is a perspective view illustrating the polycrystalline diamond compact which is finally produced, and FIG. 11 is a cross-sectional view of the polycrystalline diamond compact of FIG. 10 taken along line A-A.

Figure 11:
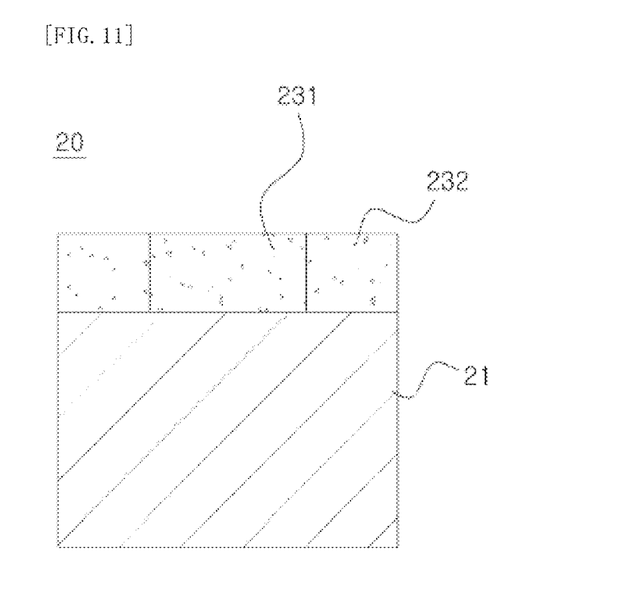
FIG. 11 is a cross-sectional view of the polycrystalline diamond compact of FIG. 10 taken along line A-A.

As illustrated in FIGS. 10 and 11, the first polycrystalline diamond sintered body 231 and the second polycrystalline diamond sintered body 232 are formed on the cemented substrate 21. The first polycrystalline diamond sintered body 231 is positioned inside and the second polycrystalline diamond sintered body 232 is formed around the first polycrystalline diamond sintered body 231.

During sintering, according to a characteristic of the final desired polycrystalline diamond compact, an optimal sintering temperature is set. In this case, when the sintering temperature is too low or too high, properties of the polycrystalline diamond compact such as impact resistance or abrasion resistance deviates from a range of the desired properties and thus defects of the product are generated.

Figure 12:
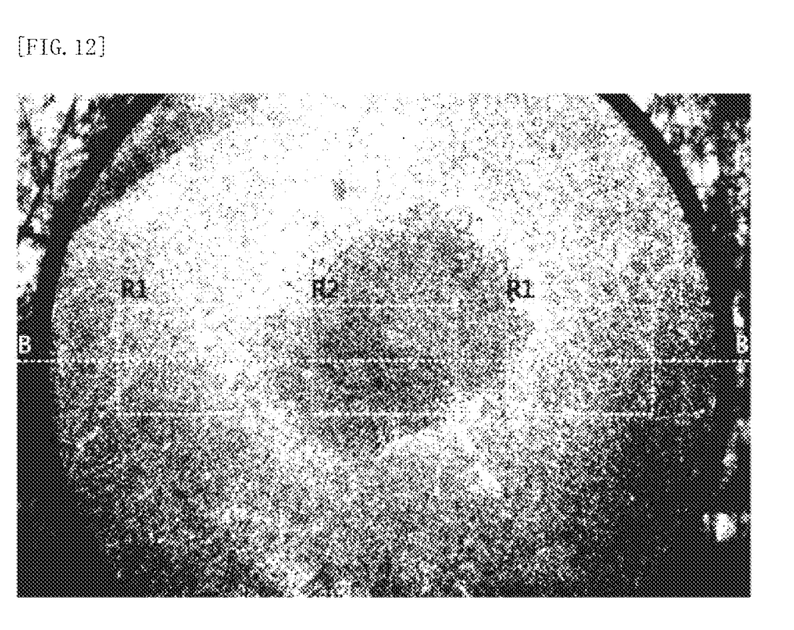
FIG. 12 is a photograph illustrating an appearance of a polycrystalline diamond sintered body according to Comparative Example.
Figure 13:
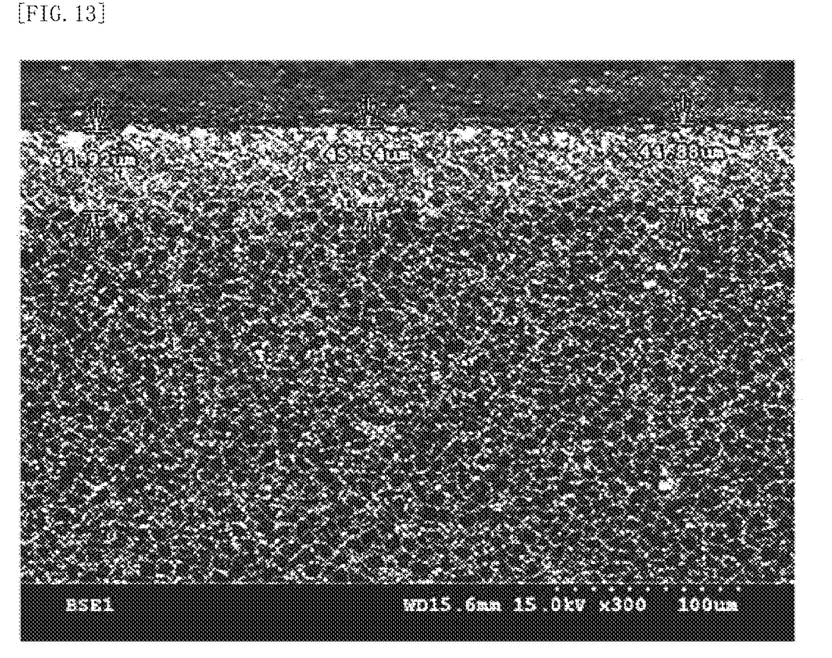
FIG. 13 is an SEM photograph for a cut section of a part R1 taken along line B-B of FIG. 12.
Figure 14:
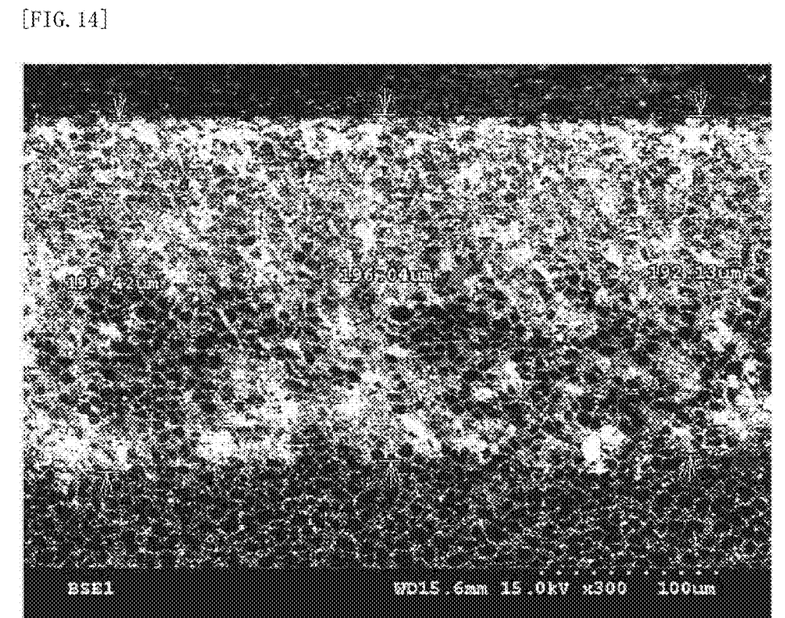
FIG. 14 is an SEM photograph for a cut section of a part R2 taken along line B-B of FIG. 12.

The examples are illustrated in FIGS. 12 to 15. An SEM photograph for a cut section of a part R1 taken along line B-B of the polycrystalline diamond sintered body illustrated in FIG. 12 is illustrated in FIG. 13 and an SEM photograph for a cut section of a part R2 is illustrated in FIG. 14. In FIG. 13, the density between the particles is good, but in FIG. 14, a lot of parts having low density between the particles are generated by the lack of the temperature.

Figure 15:
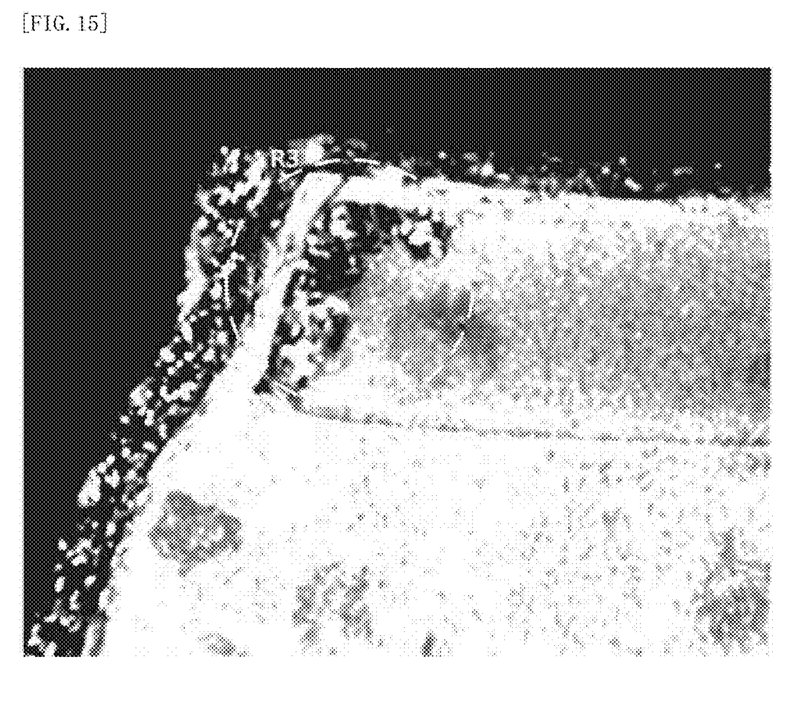
FIG. 15 is a cross-sectional view illustrating an appearance in which over-sintering is shown at a side part R3 of the polycrystalline diamond sintered body according to Comparative Example.

Reversely, in the case of further increasing the sintering temperature in order to enhance the sintering density of the central part, as illustrated in FIG. 15, a side part R3 is over-sintered and thus, the particle growth is generated and additional defects are generated.

As such, in the case of forming one polycrystalline diamond sintered body by sintering once, temperatures of the interior and the exterior of the polycrystalline diamond sintered body are differently applied due to a characteristic heated from the periphery of the sintered body during sintering, and as a result, a difference in thermal and mechanical characteristics of the interior and the exterior of the polycrystalline diamond sintered body is generated.

However, in the case of the polycrystalline diamond compact 20 according to the exemplary embodiment, the first polycrystalline diamond sintered body 231 and the second polycrystalline diamond sintered body 232 are sequentially sintered and thus it is easy to match characteristics of the interior and the exterior. The first polycrystalline diamond sintered body 231 at the inside is sintered by the primary sintering to have a predetermined characteristic and then the heat is relatively concentrated in the second polycrystalline diamond sintered body 232 at the outside during the secondary sintering, and thus, the characteristic of the second polycrystalline diamond sintered body 232 is implemented.

Although preferable embodiments of the present invention have been exemplarily described as above, the technical spirit of the present invention is limited to the preferable embodiments and the present invention can be variously implemented within the scope without departing from the spirit of the present invention which is specifically described in the appended claims.

The invention claimed is:

1. A method for producing a polycrystalline diamond compact provided with multiple polycrystalline diamond sintered bodies, in the method for producing the polycrystalline diamond compact includes the step of having at least one polycrystalline diamond sintered body formed on a cemented substrate, the method comprising:
a first step for forming first diamond powder into a circular disk having a diameter smaller than a diameter of the cemented substrate:
a second step for producing a first polycrystalline diamond sintered body by sintering the first diamond powder;
a third step for positioning the first polycrystalline diamond sintered body in a center of the cemented substrate, and forming second diamond powder into a ring, where the ring is disposed on an outer circumferential surface of around the first polycrystalline diamond sintered body; and
sintering the second diamond powder to form a second polycrystalline diamond sintered body.

2. The method of claim 1, wherein the second step includes producing an intermediate polycrystalline diamond sintered body having a diameter larger than the diameter of the cemented substrate by sintering the first diamond powder; and cutting the intermediate polycrystalline diamond sintered body to generate the first polycrystalline diamond sintered body.

3. The method of claim 2, wherein the intermediate polycrystalline diamond sintered body is dimensioned so that a plurality of the first polycrystalline diamond sintered bodies is generated by cutting the intermediate polycrystalline diamond sintered body.

4. The method of claim 2, wherein the intermediate polycrystalline diamond sintered body has a diameter of 60 to 75 mm, the first polycrystalline diamond sintered body has a diameter of 3 to 15 mm, the second polycrystalline diamond sintered body has a diameter of 13 to 20 mm, and the diameter of the first polycrystalline diamond sintered body is formed within 70% of the diameter of the second polycrystalline diamond sintered body.

5. The method of claim 1, wherein the first diamond powder and the second diamond power includes metal binders.

6. The method of claim 5, wherein the metal binders include cobalt (Co).

7. The method of claim 1, further comprising: mixing metal binder powder with the first diamond powder.

8. The method of claim 7, wherein in the fourth step, the second diamond powder is sintered by using a metal binder component released from the cemented substrate.

* * * * *